(12) United States Patent
Taya

(10) Patent No.: US 12,074,461 B2
(45) Date of Patent: Aug. 27, 2024

(54) CONTACTLESS POWER SUPPLY DEVICE, POWER RECEPTION DEVICE, AND POWER TRANSMISSION DEVICE

(71) Applicant: LAPIS TECHNOLOGY CO., LTD., Yokohama (JP)

(72) Inventor: Takashi Taya, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 17/705,805

(22) Filed: Mar. 28, 2022

(65) Prior Publication Data

US 2022/0320915 A1    Oct. 6, 2022

(30) Foreign Application Priority Data

Mar. 30, 2021  (JP) .................................. 2021-56344

(51) Int. Cl.
*H02J 50/12* (2016.01)
*H02J 50/80* (2016.01)
*H02J 50/90* (2016.01)

(52) U.S. Cl.
CPC ............ *H02J 50/90* (2016.02); *H02J 50/12* (2016.02); *H02J 50/80* (2016.02)

(58) Field of Classification Search
CPC .. H02J 50/90; H02J 50/12; H02J 50/80; H02J 50/005
USPC ...................................................... 307/104
See application file for complete search history.

(56) References Cited

U.S. PATENT DOCUMENTS

| 10,444,041 | B2* | 10/2019 | Kondou | G01D 5/24476 |
| 11,309,746 | B2* | 4/2022 | Nakano | H02J 50/12 |
| 2004/0013047 | A1* | 1/2004 | Shimizu | G04C 10/00 368/184 |
| 2014/0015329 | A1* | 1/2014 | Widmer | B60L 53/37 307/104 |
| 2015/0001960 | A1* | 1/2015 | Niizuma | H02J 50/10 307/104 |

(Continued)

FOREIGN PATENT DOCUMENTS

| CN | 102510118 | * | 6/2012 |
| JP | 2019-097383 A | | 6/2019 |

*Primary Examiner* — Rexford N Barnie
*Assistant Examiner* — Xuan Ly
(74) *Attorney, Agent, or Firm* — VOLENTINE, WHITT & FRANCOS, PLLC

(57) ABSTRACT

A contactless power supply device contactless power supply device includes a power transmission module and a power reception module. The power transmission module includes a resonance circuit. The resonance circuit includes a power transmission coil generating a high-frequency magnetic field. The power reception module includes a resonance circuit. The resonance circuit includes a power reception coil generating a high frequency current by the high-frequency magnetic field. At least one of the power transmission module and the power reception module includes a relative movement detection unit that detects an amplitude change of a high-frequency voltage corresponding to the high frequency current flowing through the at least one resonance circuit of the power transmission module or the power reception module and outputs an output signal indicating a physical relative movement of the power transmission coil and the power reception coil.

24 Claims, 11 Drawing Sheets

(56) References Cited

U.S. PATENT DOCUMENTS

| | | | |
|---|---|---|---|
| 2015/0263536 A1* | 9/2015 | Niizuma | H02J 50/10 307/104 |
| 2016/0134334 A1* | 5/2016 | Park | H04B 5/0093 307/104 |
| 2016/0327444 A1* | 11/2016 | Ichikawa | H01F 38/18 |

* cited by examiner

WHEN POWER TRANSMISSION COIL AND POWER RECEPTION COIL ARE IN CERTAIN POSITIONAL RELATIONSHIP
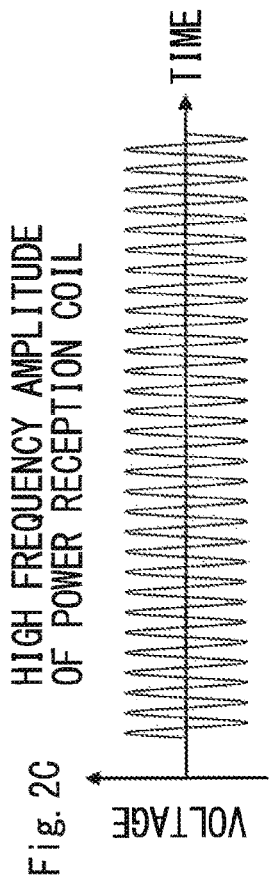
Fig. 2A  HIGH FREQUENCY AMPLITUDE OF POWER TRANSMISSION COIL
Fig. 2B  OUTPUT VOLTAGE OF RECTIFIER CIRCUIT ON POWER TRANSMISSION COIL
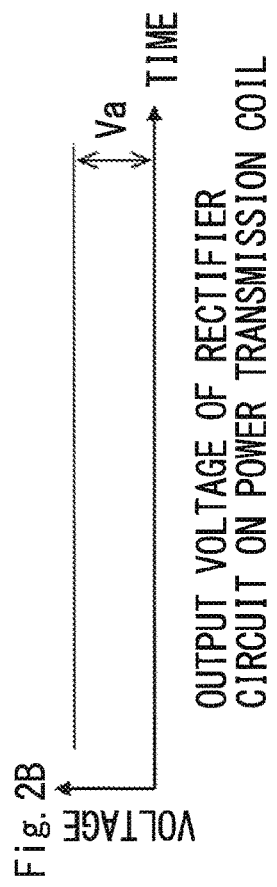
Fig. 2C  HIGH FREQUENCY AMPLITUDE OF POWER RECEPTION COIL
Fig. 2D  OUTPUT VOLTAGE OF RECTIFIER CIRCUIT ON POWER RECEPTION COIL

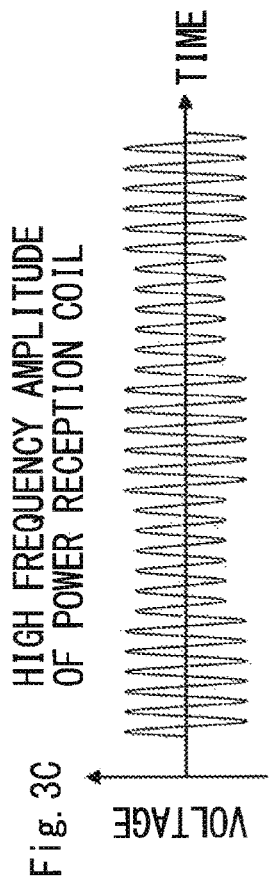
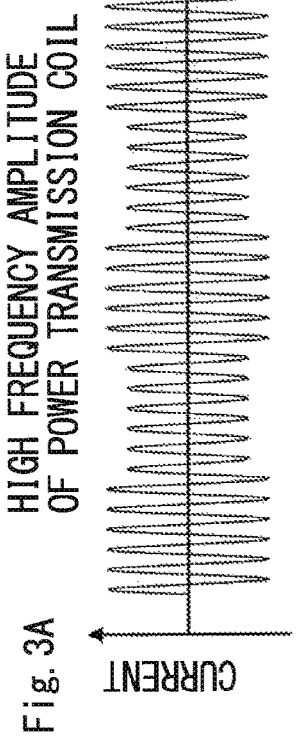
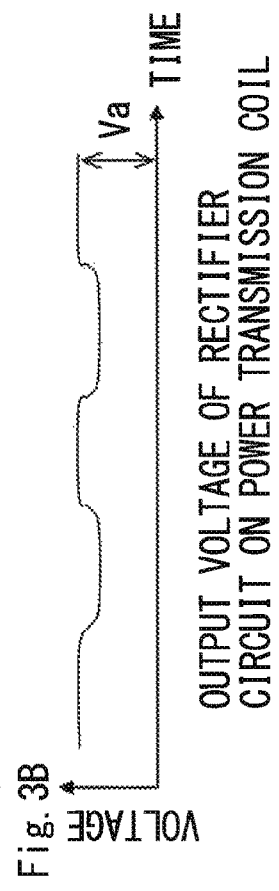

CONTACTLESS POWER SUPPLY DEVICE, POWER RECEPTION DEVICE, AND POWER TRANSMISSION DEVICE

CROSS-REFERENCE TO RELATED APPLICATION

This application is based upon and claims the benefit of priority from the prior Japanese Patent Application No. 2021-056344 filed on Mar. 30, 2021, the entire contents of which are incorporated herein by reference.

BACKGROUND OF THE INVENTION

1. Technical Field

The present invention relates to a contactless power supply device that supplies an electric power in a non-contact manner, a power reception device, and a power transmission device.

2. Description of the Related Art

There is known a Near Field Communication (NFC) standard used for short range communication applications. In recent years, by taking advantage of the fact that NFC using a 13.56 MHz band frequency can allow for the use of a downsized antenna, a contactless power supply device used for NFC earphone earphones and the like has been developed. For example, there is a system that accurately detects a foreign matter residing near a coil of a power reception side without newly disposing a sensor (JP-A-2019-97383).

However, in an application for the contactless power supply device, it is sometimes required, for example, to detect a vibration generated between a power transmission side and the power reception side instead of the foreign matter, and it is difficult to solve such problems with the prior art.

SUMMARY OF THE INVENTION

The present invention has been made in consideration of the above-described problem of the prior art, and it is an object of the present invention to provide a contactless power supply device, a power reception device, and a power transmission device that can determine presence/absence and an intensity of a mechanical vibration, a frequency of the vibration, and an intensity distribution of frequency components.

A contactless power supply device of the present invention performs power transmission and power reception of an electric power in a non-contact manner. The contactless power supply device includes a power transmission module and a power reception module. The power transmission module includes a resonance circuit. The resonance circuit includes a power transmission coil generating a high-frequency magnetic field. The power reception module includes a resonance circuit. The resonance circuit includes a power reception coil generating a high frequency current by the high-frequency magnetic field. At least one of the power transmission module and the power reception module includes a relative movement detection unit that detects an amplitude change of a high-frequency voltage corresponding to the high frequency current flowing through the at least one resonance circuit of the power transmission module or the power reception module and outputs an output signal indicating a physical relative movement of the power transmission coil and the power reception coil.

A power reception device of the present invention performs power reception of an electric power in a non-contact manner via a high-frequency magnetic field. The contactless power supply device includes a resonance circuit and a relative movement detection unit. The resonance circuit includes a power reception coil that generates a high frequency current by the high-frequency magnetic field. The relative movement detection unit detects an amplitude change of a high-frequency voltage corresponding to the high frequency current flowing through the resonance circuit. The relative movement detection unit outputs an output signal indicating a physical relative movement of a power transmission coil and the power reception coil.

A power transmission device of the present invention performs power transmission of an electric power in a non-contact manner to a power reception coil via a high-frequency magnetic field. The contactless power supply device includes a resonance circuit and a relative movement detection unit. The resonance circuit includes a power transmission coil that generates the high-frequency magnetic field. The relative movement detection unit detects an amplitude change of a high-frequency voltage corresponding to a high frequency current induced in the resonance circuit corresponding to a counter-electromotive force by a variation of an induced current in the power reception coil. The relative movement detection unit outputs an output signal indicating a physical relative movement of the power transmission coil and the power reception coil.

A contactless power supply device of the present invention performs power transmission and power reception of an electric power in a non-contact manner. The contactless power supply device includes a power transmission module and a power reception module. The power transmission module includes a resonance circuit. The resonance circuit including a power transmission coil generating a high-frequency magnetic field. The power reception module includes a resonance circuit. The resonance circuit includes a power reception coil generating a high frequency current by the high-frequency magnetic field. In the power transmission module and the power reception module, the power transmission coil and the power reception coil are mounted to a fixed bearing and a rotator rotating by being rotatably mounted to the bearing, respectively to face each other coaxially. At least one of the power transmission module and the power reception module includes a relative movement detection unit that detects an amplitude change of a high-frequency voltage corresponding to the high frequency current flowing through the at least one resonance circuit of the power transmission module or the power reception module and outputs an output signal indicating a physical relative movement of the power transmission coil and the power reception coil.

A contactless power supply device of the present invention performs power transmission and power reception of an electric power in a non-contact manner. The contactless power supply device includes a power transmission module and a power reception module. The power transmission module includes a resonance circuit. The resonance circuit includes a power transmission coil generating a high-frequency magnetic field. The power reception module includes a resonance circuit. The resonance circuit including a power reception coil generating a high frequency current by the high-frequency magnetic field. In the power transmission module and the power reception module, the power transmission coil and the power reception coil are mounted to a fixed structure and a moving body movable away from the structurer, respectively to face each other coaxially. At least one of the power transmission module and the power reception module includes a relative movement detection unit that detects an amplitude change of a high-frequency voltage corresponding to the high frequency current flowing through the at least one resonance circuit of the power transmission module or the power reception module and outputs an output signal indicating a physical relative movement of the power transmission coil and the power reception coil.

According to the present invention, since the relative movement detection unit that outputs the output signal indicating the physical relative movement of the power transmission coil and the power reception coil is included, it is possible to achieve the contactless power supply device, the power reception device, and the power transmission device that provide an advantageous effect of being able to determine the presence/absence and the intensity of the mechanical vibration, the frequency of the vibration, and the intensity distribution of the frequency components.

BRIEF DESCRIPTION OF THE DRAWINGS

FIG. 2A is a graph illustrating a carrier wave waveform of a high-frequency signal (a current and a voltage) of a power transmission coil when the power transmission coil and a power reception coil in the contactless power supply device of the first embodiment are in a certain positional relationship;

FIG. 2B is a graph illustrating an output voltage waveform of a wave detection circuit coupled to the power transmission coil when the power transmission coil and the power reception coil in the contactless power supply device of the first embodiment are in a certain positional relationship;

FIG. 2C is a graph illustrating a waveform of a high-frequency signal (a current and a voltage) generated in the power reception coil magnetically coupled to the power transmission coil when the power transmission coil and the power reception coil in the contactless power supply device of the first embodiment are in a certain positional relationship;

FIG. 2D is a graph illustrating an output voltage waveform of a wave detection circuit coupled to the power reception coil when the power transmission coil and the power reception coil in the contactless power supply device of the first embodiment are in a certain positional relationship;

FIG. 3A is a graph illustrating the carrier wave waveform of the high-frequency signal (the current and the voltage) of the power transmission coil when the power transmission coil and the power reception coil in the first embodiment relatively vibrate;

FIG. 3B is a graph illustrating the output voltage waveform of the wave detection circuit coupled to the power transmission coil when the power transmission coil and the power reception coil in the first embodiment relatively vibrate;

FIG. 3C is a graph illustrating the waveform of the high-frequency signal (the current and the voltage) generated in the power reception coil magnetically coupled to the power transmission coil when the power transmission coil and the power reception coil in the first embodiment relatively vibrate;

FIG. 3D is a graph illustrating the output voltage waveform of the wave detection circuit coupled to the power reception coil when the power transmission coil and the power reception coil in the first embodiment relatively vibrate;

DETAILED DESCRIPTION OF THE INVENTION

Figure 1:
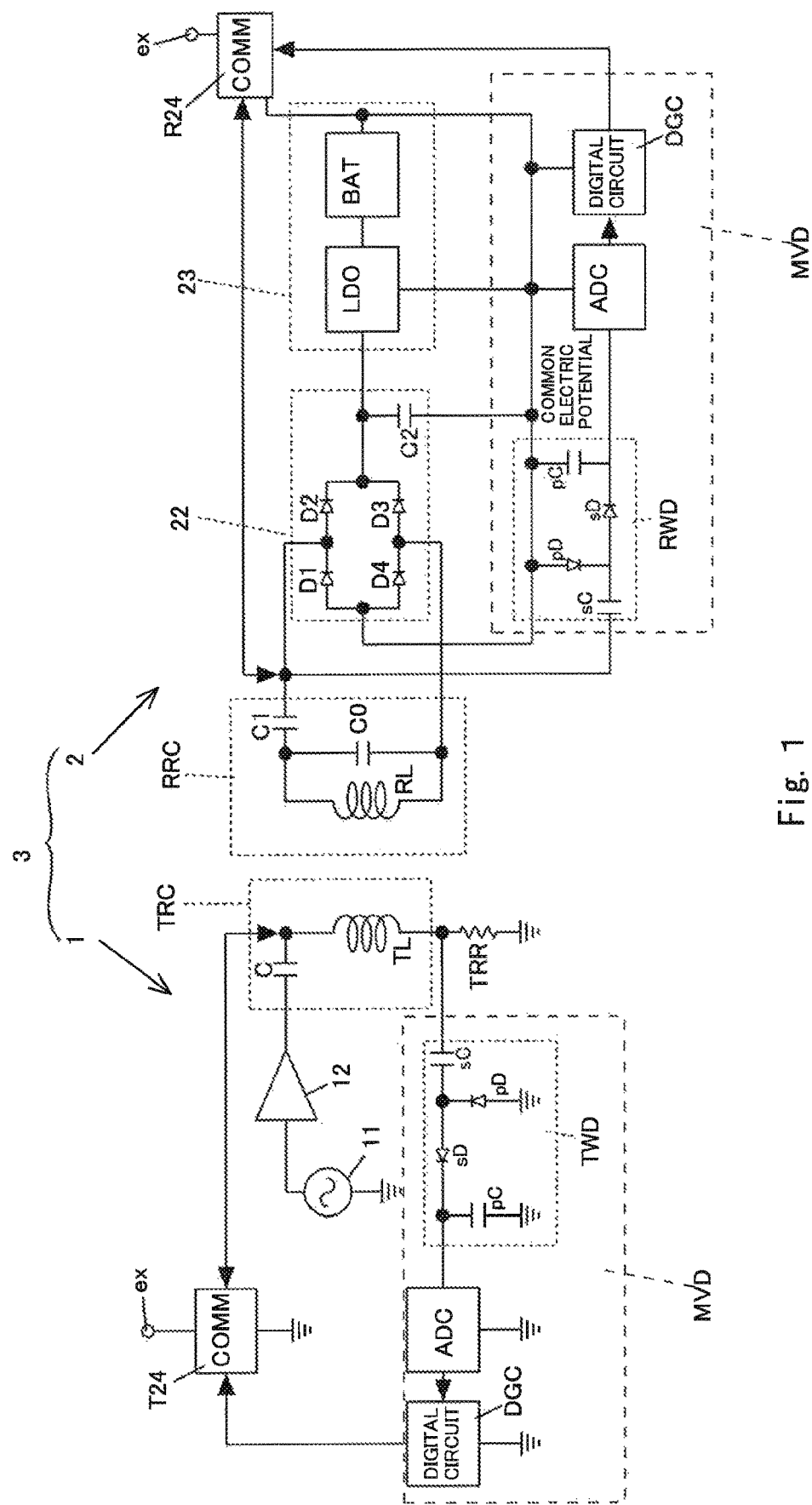
FIG. 1 is a circuit block diagram illustrating a contactless power supply device of a first embodiment.

The following describes embodiments of the present invention in detail with reference to the accompanied drawings. In the embodiments, identical reference numerals are given to the components having substantially identical function and constitution, and repeated explanation is omitted.

First Embodiment

FIG. 1 schematically illustrates a circuit diagram of a contactless power supply device 3 of the embodiment constituted of a power transmission device 1 (a module) and a power reception device 2 (a module). The contactless power supply device 3 is also a certain kind of motion detection device constituted of the power transmission device 1 and the power reception device 2 performing power transmission and power reception of an electric power in a non-contact manner and an exchange of data.

The following describes the power transmission device 1 and the power reception device 2.

(Power Transmission Device)

The power transmission device 1 includes a high-frequency signal source 11 coupled to, for example, a crystal oscillation circuit (not illustrated) generating a high-frequency signal and an amplifier circuit 12 that takes an output of the high-frequency signal source 11 as an input.

The amplifier circuit 12 supplies its high-frequency power output (in other words, a carrier wave) to a power transmission coil TL via a capacitor C to flow a high frequency current through the power transmission coil TL. The power transmission coil TL generates a high-frequency magnetic field. The high-frequency signal source 11, the amplifier circuit 12, the capacitor C, and the power transmission coil TL constitute a power transmission circuit of the power transmission device 1. The capacitor C and the power transmission coil TL constitute a resonance circuit TRC.

The power transmission device 1 includes a resistor TRR, a wave detection circuit TWD, an Analog to Digital Converter (AD converter) ADC, and a digital circuit DGC. The resistor TRR is coupled in series to the power transmission coil TL. The wave detection circuit TWD takes a high-frequency voltage generated at a connection point between the power transmission coil TL and the resistor TRR as an input. The AD converter ADC takes an electric signal converted to a DC voltage signal or a low frequency voltage signal by the diode wave detection circuit TWD as an input. The digital circuit DGC takes a digital signal output from the AD converter ADC as an input.

The wave detection circuit TWD taking the resistor TRR as an input, the AD converter ADC, and the digital circuit DGC constitute a relative movement detection unit MVD of the transmission device 1. Instead of using the resistor TRR as a high-frequency current detecting unit of the power transmission coil TL, while not illustrated, a tap may be disposed in the power transmission coil TL, another coil may be used, and another capacitor may be used to take out the high frequency current from the coil terminal.

The wave detection circuit TWD is a voltage doubler rectifier circuit constituted of 2 stage stacked half-wave rectifier circuits (a capacitor sC and a diode pD, and a diode sD and a capacitor pC from an input side) where, for example, as illustrated in FIG. 1, polarity is different. The wave detection circuit TWD extracts a DC component or an AC component from the high-frequency voltage corresponding to the high frequency current of the power transmission coil TL and outputs the DC component or the AC component to the AD converter ADC as an extracted signal. While a positive polarity diode wave detection circuit using diodes is indicated as the wave detection circuit TWD of the power transmission device 1, other transistor wave detection circuits such as a multiplier circuit using transistors may be used, and the polarity that converts the amplitude may be negative polarity. A filter may be disposed with respect to the output of the wave detection circuit TWD.

To perform correct measurement in detecting a frequency of the extracted signal by the relative movement detection unit MVD, AD conversion is performed by the AD converter ADC at a sampling frequency that is equal to or more than twice the vibration frequency based on a sampling theorem. Measuring the extracted signal by the relative movement detection unit MVD using the sampling frequency allows obtaining a correct vibration amount of the object to be detected where the power transmission device 1 or the power reception device 2 is mounted.

The digital circuit DGC performs filter processing or Fourier transform processing (analysis) on a digital output obtained by converting an amplitude change of the extracted signal into a digital signal by the AD converter ADC. Further, the digital circuit DGC has a function to perform determination and control after analysis of the signal processing.

Furthermore, the power transmission device 1 is constituted to include a communication circuit T24. The communication circuit T24 is coupled to the digital circuit DGC. The communication circuit T24 includes an external terminal ex for externally outputting a result after the analysis of the signal processing such as vibration detection by the digital circuit DGC.

The communication circuit T24 is coupled to the connection point between the power transmission coil TL and the capacitor C of the resonance circuit TRC and executes communication that performs an exchange of data with the power reception device 2 via the power transmission coil TL.

The communication circuit T24 has an NFC communication function that controls, for example, in addition to the exchange of authentication data to authenticate whether or not the power reception device 2 is a power transmission target of the power transmission device 1, the exchange of a power reception notification notifying whether or not the power reception device 2 has received the electric power transmitted from the power transmission device 1, or the like. As a load modulation communication such as the NFC communication, Amplitude Shift Keying (ASK) modulation, Frequency Shift Keying (FSK), Phase Shift Keying (PSK), and Quadrature Amplitude Modulation (QAM), where the magnetic field coupling is used, can be utilized.

By performing the NFC communication with the power reception device 2 via the power transmission coil TL, the communication circuit T24 acquires vibration detection data (described later) in the power reception device 2. Additionally, the communication circuit T24 can perform the exchange of information on a remaining amount of a secondary battery BAT of a load circuit 23 (described later) and the exchange of various kinds of pieces of information for the contactless power supplying to determine an electric power amount to be transmitted. Then, the communication circuit T24 adjusts an amplification factor of the amplifier circuit 12 corresponding to the determined electric power amount. This delivers a transmission electric power from the power transmission device 1 corresponding to the electric power amount to be transmitted.

(Power Reception Device)

The power reception device 2 includes a power reception coil RL that can be disposed so as to face the power transmission coil TL and to be magnetically coupled it and a power reception circuit coupled to the power reception coil RL. Similarly to the power transmission coil TL of the power transmission device 1, as the power reception coil RL, a spiral coil constituted on a printed circuit board or a flexible substrate, or a coil constituted of a helical type winding can be used.

The power reception circuit is constituted to include a resonance circuit RRC including the power reception coil RL, a rectifier circuit 22, and the load circuit 23, which are coupled in the descending order. In the power reception circuit, the power reception coil RL of the resonance circuit RRC and a capacitor C0 constitute a secondary side resonance circuit and generates an electromotive force (the high-frequency signal) by a magnetic field coupling effect generated by the power transmission device 1.

The resonance circuit is constituted of the power reception coil RL and the capacitor C0. A capacitor C1 of the resonance circuit RRC is one for matching an impedance when the rectifier circuit 22 side is viewed from the resonance circuit RRC.

The rectifier circuit 22 rectifies an AC voltage (an AC signal) corresponding to the electric power received via the resonance circuit RRC to obtain a DC output voltage. The rectifier circuit 22 is, for example, a full-wave rectifier circuit. Though not specifically limited, the rectifier circuit 22 is constituted to include a diode bridge circuit formed of diodes D1 to D4 and a smoothing capacitor C2. In the diode bridge circuit, one of input terminals corresponding to a connection point between the diode D1 and the diode D2 is coupled to the capacitor C1 of the resonance circuit RRC. In the present invention, a type of the rectifier circuit 22 is not particularly limited.

In the diode bridge circuit, one end of the smoothing capacitor C2 is coupled to an output terminal corresponding to a connection point between the diode D3 and the diode D2. The smoothing capacitor C2 smooths the voltage rectified by the diode bridge circuit. A rectified voltage at the one end of the smoothing capacitor C2 is supplied to the load circuit 23. The other end of the smoothing capacitor C2 is coupled to a common electric potential. Thus, the high frequency current (electric power) generated in the power reception coil RL by electromagnetic induction with the power transmission coil TL is fed to the rectifier circuit 22, and the direct current output of the rectifier circuit 22 is fed to the load circuit 23.

In the load circuit 23, the secondary battery BAT such as a super capacitor, a linear regulator LDO to charge the secondary battery BAT, and the like are included. The linear regulator LDO can supply power source not only to the secondary battery BAT but also to a communication circuit R24, which will be described later, the AD converter ADC, and the digital circuit DGC. Accordingly, each unit of the power reception device 2 can be supplied with a constant power supply voltage necessary for its operation. In a case of a step-down type charge control circuit, a linear-regulator type linear charging circuit that performs a step-down operation may be used, or a switching charging circuit may be used.

Furthermore, the power reception device 2 includes the relative movement detection unit MVD that includes a wave detection circuit RWD, the AD converter ADC, and the digital circuit DGC and is similar to the relative movement detection unit MVD of the power transmission device 1. The wave detection circuit RWD takes a high-frequency voltage that comes from the power reception coil RL via the capacitor C1 and is generated at a connection point with the capacitor C1 as an input. The AD converter ADC takes an electric signal converted to a DC voltage signal or a low frequency voltage signal by the wave detection circuit RWD as an input. The digital circuit DGC takes a digital signal output from the AD converter ADC as an input. While the capacitor C1 is directly used as a unit for detecting a high-frequency amplitude of the power reception coil RL with respect to the wave detection circuit RWD, as other units, a resistor (not illustrated) or a tap (not illustrated) may be disposed to the power reception coil RL to supply the signal to the wave detection circuit RWD.

The wave detection circuit RWD is a voltage doubler rectifier circuit (the capacitor sC and the diode pD, and the diode sD and the capacitor pC from the input side) similar to the wave detection circuit TWD of the power transmission device 1. The wave detection circuit RWD extracts the DC component or the AC component from the high-frequency voltage corresponding to the high frequency current of the power transmission coil RL and outputs the DC component or the AC component to the AD converter ADC as the extracted signal. While the positive polarity diode wave detection circuit using diodes is indicated as the wave detection circuit RWD for extraction, similarly to the wave detection circuit TWD of the power transmission device 1, other transistor wave detection circuits such as a multiplier circuit using transistors may be used, and the polarity that converts the amplitude may be negative polarity. A filter may be disposed with respect to the output of the wave detection circuit RWD.

The AD converter ADC and the digital circuit DGC that takes the digital signal output of the AD converter ADC as the input have similar constitutions as the relative movement detection unit MVD of the power transmission device 1.

The power reception device 2 is constituted to include the communication circuit R24 similar to the communication circuit T24 of the power transmission device 1. The communication circuit R24 is coupled to the digital circuit DGC and is coupled to a connection point of the capacitor C1 of the resonance circuit RRC to output result data (vibration detection data) after an analysis of signal processing such as vibration detection by the digital circuit DGC of the relative movement detection unit MVD to the power transmission device 1

The communication circuit R24 performs the NFC communication with the power transmission device 1 by using the power reception coil RL as a communication antenna. The communication circuit R24 has a function to perform ON/OFF control of the load circuit 23. The communication circuit R24 can execute a transmission of the vibration detection data by the NFC communication via the resonance circuits RRC, TRC. The communication circuit R24 may include an external terminal ex for externally outputting the result data after the analysis of the signal processing such as the vibration detection by the digital circuit DGC.

As described above, by the NFC communication between the communication circuit R24 and the communication circuit T24, in addition to the transmission of the vibration detection data in the power reception device 2, for example, the exchange of the authentication and the like between the power reception device 2 and the power transmission device 1 is performed.

At least one of the power transmission device 1 and the power reception device 2 includes the relative movement detection unit MVD that detects an amplitude change of the high-frequency voltage corresponding to the high frequency current flowing through the at least one resonance circuit of the power transmission device 1 or the power reception device 2 and outputs the output signal indicating a physical relative movement of the power transmission coil TL and the power reception coil RL.

(Operation of Device)

In the power transmission device 1 of the contactless power supply device 3 illustrated in FIG. 1, by generating, for example, a high-frequency signal of 13.56 MHz with the high-frequency signal source 11, performing an electric power amplification at the amplifier circuit 12, and flowing the high frequency current through the power transmission coil TL of the resonance circuit TRC, the high-frequency magnetic field is generated in the peripheral area of the power transmission coil TL. As the high-frequency magnetic field, instead of 13.56 MHz, for example, a short-wave band of 6.78 MHz or a long-wave band of around 100 kHz may be used.

The power transmission coil TL may have an inductance of, for example, around 1 microhenry. By the resonance with the capacitor C coupled to the power transmission coil TL, the power transmission coil TL generates a high-frequency current amplitude of the carrier wave of approximately 13.56 MHz to cause the high-frequency magnetic field to occur in the peripheral area of the power transmission coil TL.

The power reception coil RL of the power reception device 2 also may have an inductance of, for example, around 1 microhenry. The power reception device 2 is configured to have the resonance circuit RRC resonating with the resonance circuit TRC of the power transmission device 1.

Accordingly, the power reception coil RL of the power reception device 2 is magnetically coupled to the power transmission coil TL by the high-frequency magnetic field in the peripheral area of the power transmission coil TL, generates a high-frequency electromotive force in the resonance circuit RRC that the power reception coil RL constitutes, and outputs the high-frequency voltage (current) to the rectifier circuit 22 in the subsequent stage.

The rectifier circuit 22 of the power reception device 2 converts the high-frequency voltage into a DC voltage and supplies, for example, 1 watt of electric power to the load circuit 23.

On the other hand, the high frequency current flows through the resistor TRR coupled in series to the power transmission coil TL of the power transmission device 1, and the high-frequency voltage is generated. The high-frequency voltage is input into the wave detection circuit TWD from the connection point of the resistor TRR.

The wave detection circuit TWD of the power transmission device 1 converts the input high-frequency voltage into the DC voltage or the AC voltage (the extracted signal).

In the power transmission device 1, the voltage (the extracted signal) is converted into a digital signal at the AD converter ADC, and the digital signal is input into the digital circuit DGC.

On the other hand, the high-frequency signal generated in the power reception coil RL of the power reception device 2 is input into the wave detection circuit RWD through the capacitor C1 coupled to the power reception coil RL.

The wave detection circuit RWD of the power reception device 2 converts the input high-frequency voltage into the DC voltage or the AC voltage (the extracted signal).

In the power reception device 2, the voltage (the extracted signal) is converted into a digital signal at the AD converter ADC, and the digital signal is input into the digital circuit DGC.

FIG. 2A is a graph illustrating the carrier wave waveform of the high-frequency signal (the current and the voltage) of the power transmission coil TL when the power transmission coil and the power reception coil are in a certain positional relationship. FIG. 2B is a graph illustrating an output voltage waveform of the wave detection circuit TWD coupled to the power transmission coil TL when the power transmission coil and the power reception coil are in a certain positional relationship. FIG. 2C is a graph illustrating a waveform of the high-frequency signal (the current and the voltage) generated in the power reception coil RL magnetically coupled to the power transmission coil TL when the power transmission coil and the power reception coil are in a certain positional relationship. FIG. 2D is a graph illustrating an output voltage waveform of the wave detection circuit RWD coupled to the power reception coil RL when the power transmission coil and the power reception coil are in a certain positional relationship.

When the positional relationship between the power transmission coil TL of the power transmission device 1 and the power reception coil RL of the power reception device 2 and a state of a proximity medium (such as air) is constant, the magnetic field coupling of both coils is constant, and the amplitudes of the high-frequency signals of both the power transmission coil TL and the power reception coil RL are constant. Thus, the outputs of the respective wave detection circuits TWD and RWD also continue to take a constant voltage value. Usually, when the voltage from the ground of the carrier wave on the power transmission device 1 side is an amplitude voltage Va, an amplitude voltage Vb on the power reception device 2 side is not identical to the amplitude voltage Va and becomes a different voltage depending on a transmission efficiency and a power reception side impedance. When neither the transmission efficiency nor the power reception side impedance changes, the amplitude voltage Va of the carrier wave and the amplitude voltage Vb of the received high-frequency signal wave become in a proportional relationship.

Here, for example, when a mechanical vibration occurs periodically to both or one of the power transmission coil TL of the power transmission device 1 and the power reception coil RL of the power reception device 2, a magnetic field coupling coefficient of both coils varies periodically. Due to this, in the power reception coil RL, the electromotive force by the magnetic field from the power transmission coil TL varies, and, simultaneously, in the power transmission coil TL, a counter-electromotive force varies due to variation of an induced current of the power reception coil RL.

FIG. 3A is a graph illustrating the carrier wave waveform of the high-frequency signal (the current and the voltage) of the power transmission coil TL when the power transmission coil and the power reception coil relatively vibrate. FIG. 3B is a graph illustrating the output voltage waveform of the wave detection circuit TWD coupled to the power transmission coil TL when the power transmission coil and the power reception coil relatively vibrate. FIG. 3C is a graph illustrating the waveform of the high-frequency signal (the current and the voltage) generated in the power reception coil RL magnetically coupled to the power transmission coil TL when the power transmission coil and the power reception coil relatively vibrate. FIG. 3D is a graph illustrating the output voltage waveform of the wave detection circuit RWD coupled to the power reception coil RL when the power transmission coil and the power reception coil relatively vibrate.

As indicated in the waves in FIGS. 3A to 3D, since, by the relative vibration of at least one of the transmission coil TL of the power transmission device 1 and the power reception coil RL of the power reception device 2, both magnetic fields varies, and the high frequency amplitudes, for example, varies periodically, the periodical variation causes the outputs of both the wave detection circuits TWD and RWD of the power transmission device 1 and the power reception device 2 to generate periodical AC signals.

The wave detection circuit TWD in the relative movement detection unit MVD of the power transmission device 1 detects the amplitude change of the high-frequency voltage corresponding to the high frequency current induced in the resonance circuit corresponding to the counter-electromotive force due to the variation of the induced current in the power reception coil RL. Then, as indicated in the output voltage waveform (FIG. 3D) of the wave detection circuit RWD, the wave detection circuit TWD outputs the output signal indicating the physical relative movement of the power transmission coil TL and the power reception coil RL. Consequently, by utilizing the event, for example, mounting each of the power transmission device 1 and the power reception device 2 to a fixed object and a rotating or moving object so as to make the magnetic field coupling possible allows vibration detection determination of the rotation or the movement by the digital circuit DGC in the relative movement detection unit MVD. For example, this can be used for a mechanism that stops the rotation or movement of the object by determining as abnormal when the vibration detection determination is made.

In FIG. 3A and FIG. 3C, while increase/decrease of the high frequency amplitude of the power transmission coil TL and the increase/decrease of the high frequency amplitude of the power reception coil RL are an identical polarity (when one increases, the other also increases), the polarity is sometimes reversed (when one increases, the other decreases) depending on the magnetic field coupling coefficient and matching conditions by the capacitors C, C0. However, it is similar in that they varies.

In the digital circuits DGC in the relative movement detection units MVD of the power transmission device 1 and the power reception device 2, by determining an intensity of a specific frequency component by digital filter processing or the Fourier transform processing, the presence/absence and the intensity of the mechanical vibration, the frequency of the vibration, and an intensity distribution (a spectral distribution) for each frequency component can be determined.

The relative movement detection unit MVD (for example, the wave detection circuit) may be disposed only in one of the power transmission device 1 or the power reception device 2 of the contactless power supply device 3.

Figure 4:
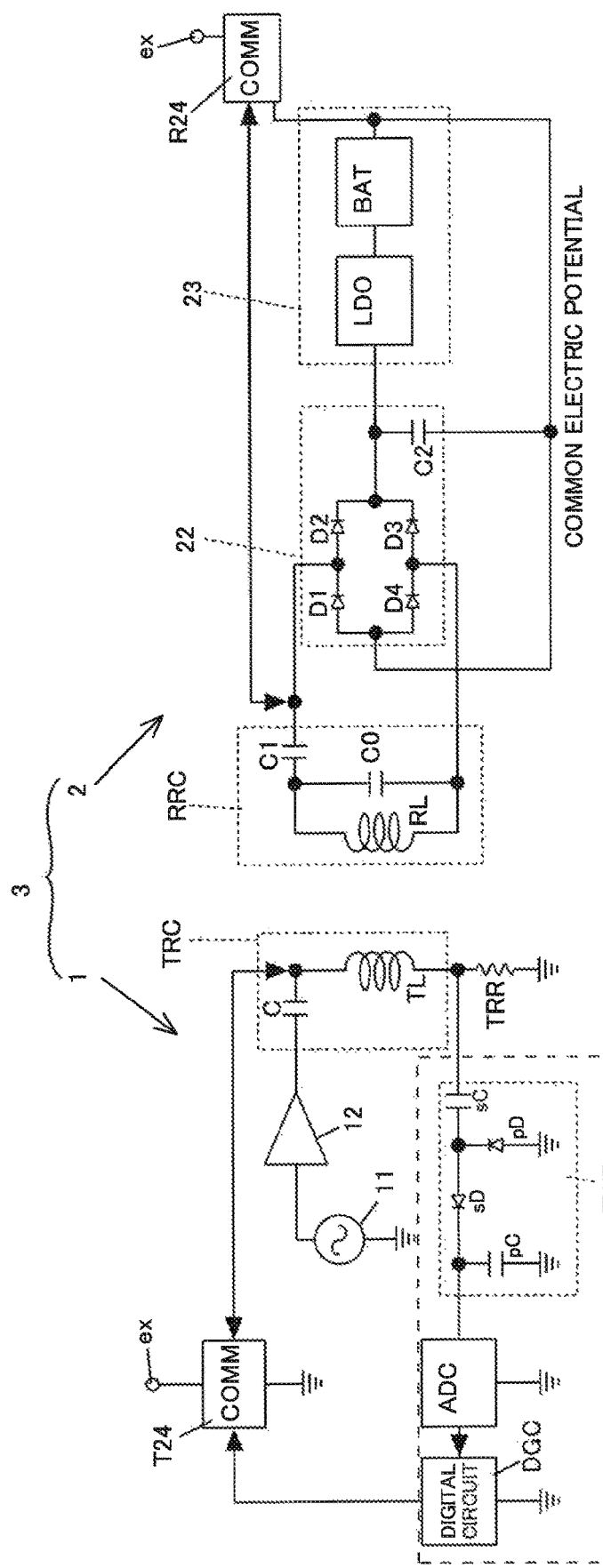
FIG. 4 is a circuit block diagram illustrating a contactless power supply device in a modification of the first embodiment.

FIG. 4 is a schematic circuit diagram illustrating the contactless power supply device 3 of a modification of the embodiment where the relative movement detection unit MVD (the wave detection circuit TWD, the AD converter ADC, the digital circuit DGC) is disposed only in the power transmission device 1, and only the relative movement detection unit is eliminated from the power reception device 2. In the contactless power supply device 3 of the modification of the embodiment illustrated in FIG. 4, while the result data after the analysis of the signal processing such as the vibration detection by the digital circuit DGC, which has been detected by the relative movement detection unit MVD of the power transmission device 1, is externally output from the external terminal ex of the communication circuit T24, by the NFC communication, it can be externally output from the external terminal ex of the communication circuit R24 of the power reception device 2.

Figure 5:
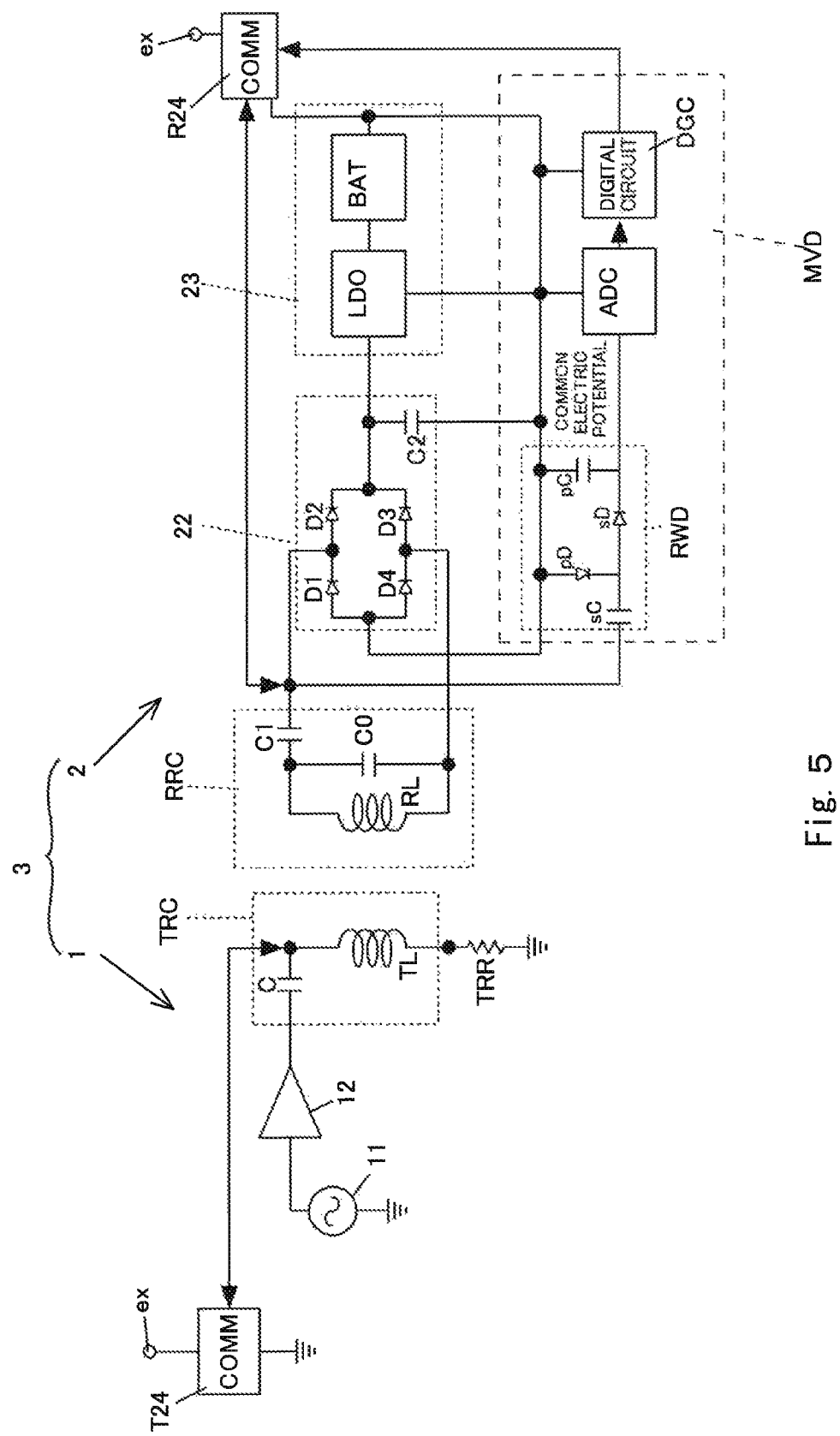
FIG. 5 is a circuit block diagram illustrating a contactless power supply device in another modification of the first embodiment.

FIG. 5 is a schematic circuit diagram illustrating the contactless power supply device 3 of another modification of the embodiment where the relative movement detection unit MVD (the wave detection circuit RWD, the AD converter ADC, the digital circuit DGC) is disposed only in the power reception device 2, and only the relative movement detection unit is eliminated from the power transmission device 1. In the contactless power supply device 3 of the modification of the embodiment illustrated in FIG. 5, while the result data after the analysis of the signal processing such as the vibration detection by the digital circuit DGC, which has been detected by the relative movement detection unit MVD of the power reception device 2, is externally output from the external terminal ex of the communication circuit R24, by the NFC communication, it can be externally output from the external terminal ex of the communication circuit T24 of the power transmission device 1.

In the embodiment and the modifications, as a mechanism that gives a periodic variation to the magnetic field coupling of the two coils of the power transmission coil TL and the power reception coil RL, in addition to vibrations of solid structures supporting both coils, respectively, structures that receive vibrations of gas or liquid, which is a peripheral medium, as the vibrations of the coils can also be used. For example, a function that efficiently converts the vibrations (or acoustics) of the gas or the liquid into the vibrations of both coils by making the solids supporting both coils, respectively, to have a plate shape.

According to the embodiment, components that are required to detect the vibration are the ones constituted inside an integrated circuit such as the wave detection circuits TWD, RWD, the AD converter ADC, and the digital circuit DGC in the power transmission device 1 and the power reception device 2, and thus, the motion detection device can be achieved very easily and inexpensively.

Second Embodiment

Figure 6:
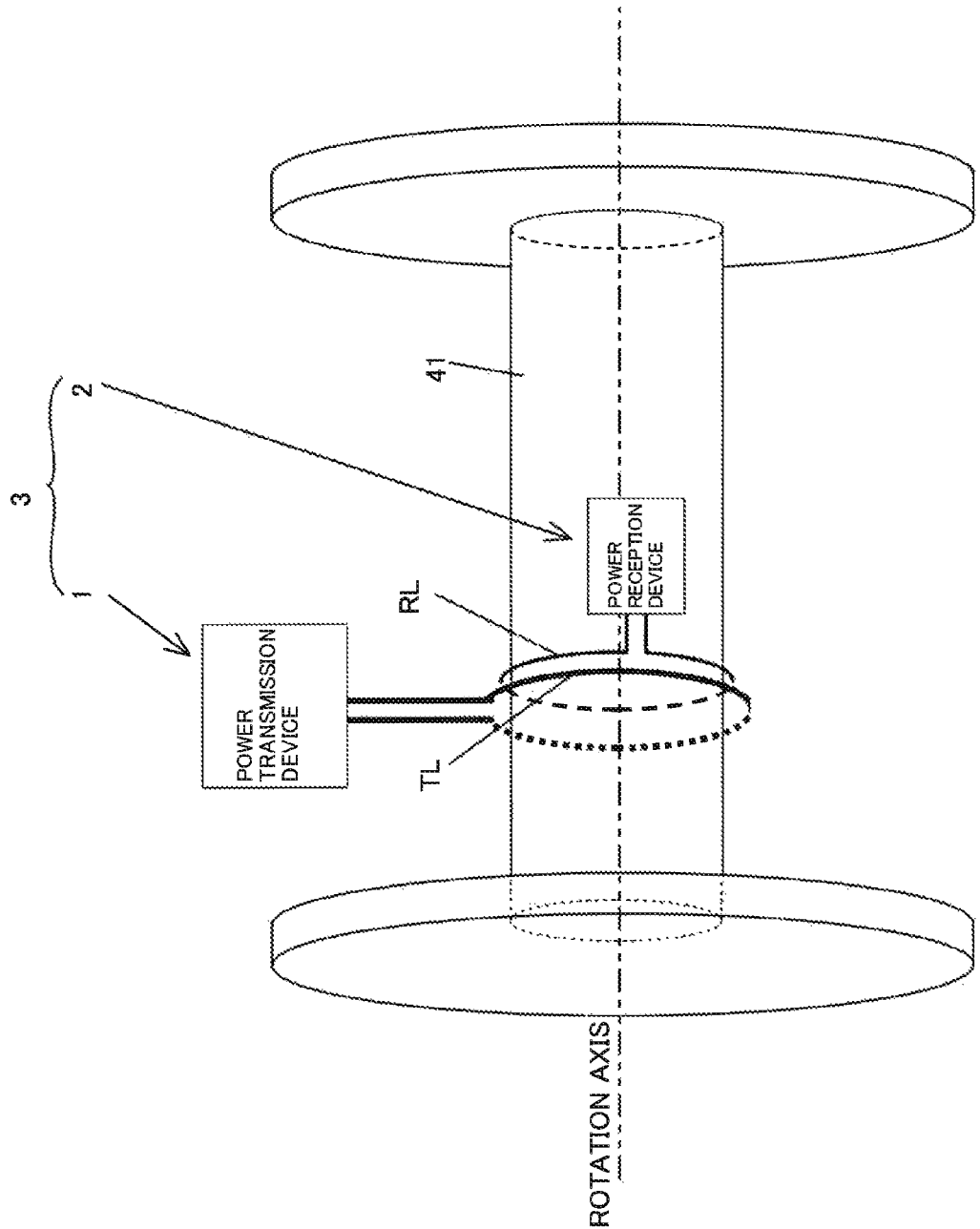
FIG. 6 is a schematic perspective view illustrating an exemplary constitution of a contactless power supply device of a second embodiment.

FIG. 6 is a schematic perspective view illustrating an exemplary constitution of a contactless power supply device according to the embodiment. The contactless power supply device is constituted to include a power transmission device 1, a power reception device 2, and a rotator 41 that is an object for detecting motion where the power reception device 2 is located. The power transmission device 1 is secured to a fixed structure (not illustrated) and coupled to an external power source. The object for detecting the motion is the rotator 41 that can rotate freely and has a structure where the power reception device 2 and the object can integrally rotate and vibrate. The power reception device 2 and the rotator 41 are not coupled to an external power source, and all the circuits inside the power reception device 2 operate by the electric power fed in a non-contact manner from the power transmission device 1. The contactless power supply device detects the motion such as a vibration of the rotator 41 where the power reception device 2 is mounted.

The contactless power supply device of the embodiment is identical to the first embodiment except the following. That is, the object for detecting the motion such as a vibration is specified, the power transmission device 1 of the first embodiment is mounted inside a fixed bearing (not illustrated) and the power reception device 2 of the first embodiment is mounted to the rotator 41 mounted inside the bearing to rotate, respectively, and the power transmission coil TL and the power reception coil RL are disposed such that they can be magnetically coupled approximately coaxially on a circumferential surface of the rotator 41.

The rotator 41 mounted to the fixed bearing is, for example, a shaft of a wheel of a vehicle such as a bicycle.

The power transmission coil TL and the power reception coil RL are wound on the circumferential surface intersecting with a plane perpendicular to a rotation axis of the rotator 41 and are disposed in a positional relationship surrounding the rotation axis. The power transmission coil TL and the power reception coil RL are magnetically coupled with one another. While the respective coils of the power transmission coil TL and the power reception coil RL are illustrated as one turn, a plurality of turns may be used. Furthermore, the power transmission coil TL and the power reception coil RL may have an ellipse shape, a quadrangular shape, or a polygonal shape other than a circular shape as long as the rotation is not hindered.

In the contactless power supply device 3 of the embodiment, by the rotation of the rotator 41, the power transmission coil TL and the power reception coil RL relatively rotate with one another. Then, as illustrated in the drawing, when the axes of the circular shapes of the respective coils are aligned in a positional relationship, the magnetic field coupling coefficient of both coils are approximately constant.

Consequently, the outputs of the wave detection circuit TWD of the power transmission device 1 and the wave detection circuit RWD of the power reception device 2 illustrated in FIG. 2B and FIG. 2D are constant voltages (see FIG. 2B, FIG. 2D).

For example, in the embodiment, when the rotator generates the vibrations or the acoustics by, for example, damage of the bearing, the variation of a relative position of both coils of the power transmission coil TL and the power reception coil RL occur, and, when the variation is periodic, the AC signals (see FIG. 3B, FIG. 3D) are generated at the outputs of the wave detection circuit TWD of the power transmission device 1 and the wave detection circuit RWD of the power reception device 2 illustrated in FIG. 3B and FIG. 3D.

Modification of Second Embodiment

Figure 7:
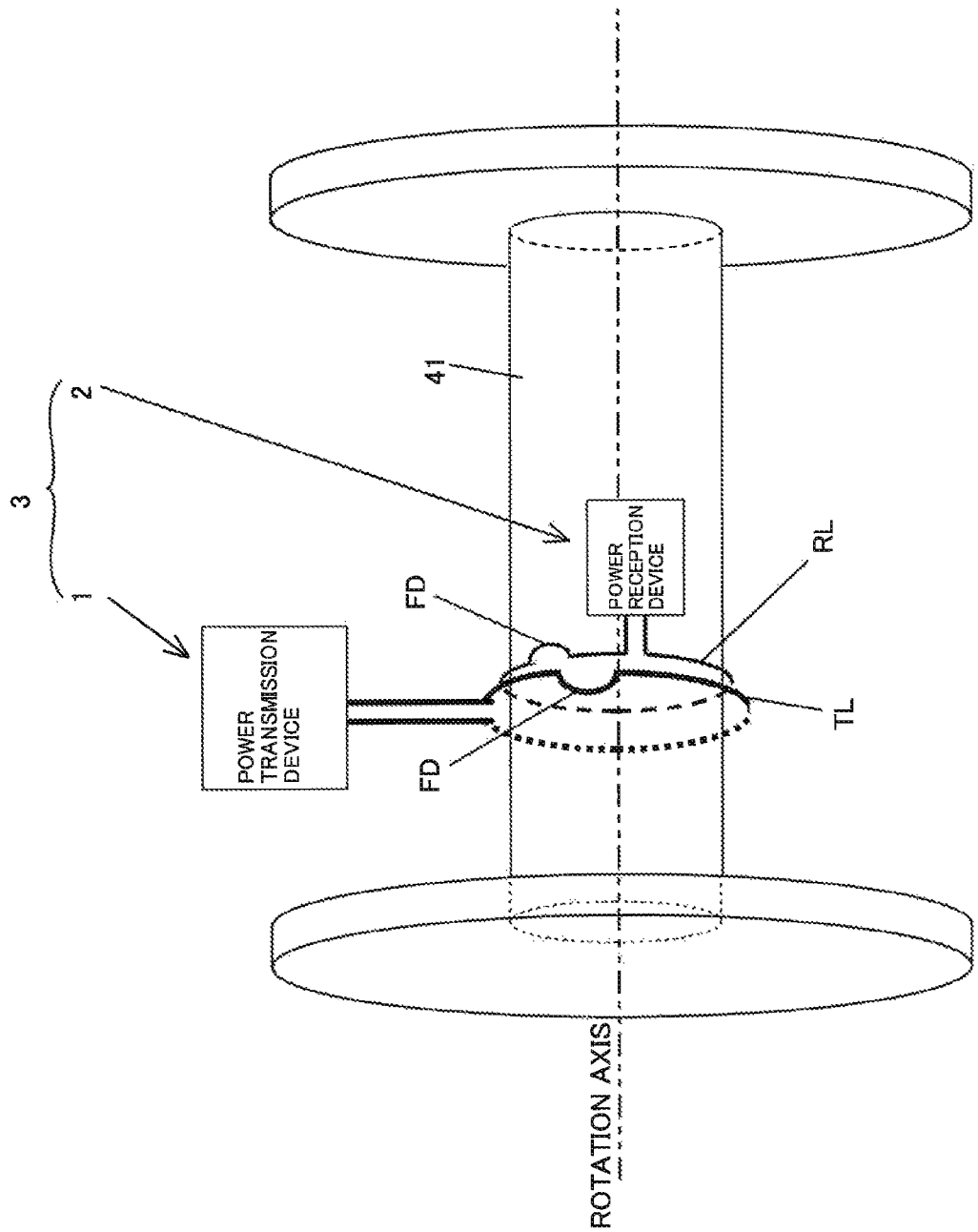
FIG. 7 is a schematic perspective view illustrating an exemplary constitution of a contactless power supply device in a modification of the second embodiment.

FIG. 7 is a schematic perspective view of the modification of the second embodiment. The modification is identical to the first embodiment except the following. That is, a deformed portion DF that is partially convex in an axial direction is disposed to each of the power transmission coil TL and the power reception coil RL wound on the circumferential surface perpendicular to the rotation axis of the rotator 41 of the second embodiment. The modification is effective in monitoring the rotation speed of the rotator 41 by detecting the periodic magnetic field variation by the deformed portion DF.

In the modification, when the rotator 41 rotates around the rotation axis, since the magnetic field coupling coefficient decreases when both the deformed portions DF are in an opposed angle relationship, periodic variations occur in the AC amplitude. Thus, the AC signals (see FIG. 3B, FIG. 3D) are generated at the outputs of the wave detection circuit TWD of the power transmission device 1 and the wave detection circuit RWD of the power reception device 2 illustrated in FIG. 3B and FIG. 3D. As the deformed portion DF of the coil, the axis of the circular shape of the coil may be inclined from the rotation axis, or deformed portion having an ellipse shape or a polygonal shape may be disposed, or multiple deformed portions or periodic deformed portions may be disposed.

In a device and a machine having a rotation portion, occurrence of the vibration or the sound is important information for detection of, for example, a failure. According to the second embodiment and the modification, the wave detection circuits TWD, RWD can be easily and inexpensively incorporated with the integrated circuit of the power transmission device 1 and the power reception device 2 and these rotation control detection mechanism can be achieved.

According to the modification of the second embodiment, by performing a frequency analysis, it is also possible to distinguish and determine the vibration related to a rotational frequency of the rotator itself from other external vibrations. By determining the frequency and the intensity of the vibration, it becomes possible, for example, to perform control of determining a failure of a rotation device to stop the device.

According to the modification of the second embodiment illustrated in FIG. 7, in a normal rotation operation, a rotation speed and a rotation angle can be also determined from only the waveforms of the output voltages of wave detection circuits TWD, RWD.

Furthermore, in the above-described embodiment, while the example where the object where the power reception device 2 is mounted is the rotator has been described, the object is not necessarily limited to a rotator. For example, it is also effective in a constitution where the power reception device 2 does not rotate with respect to the power transmission device 1 but a relative position varies.

Third Embodiment

Figure 8:
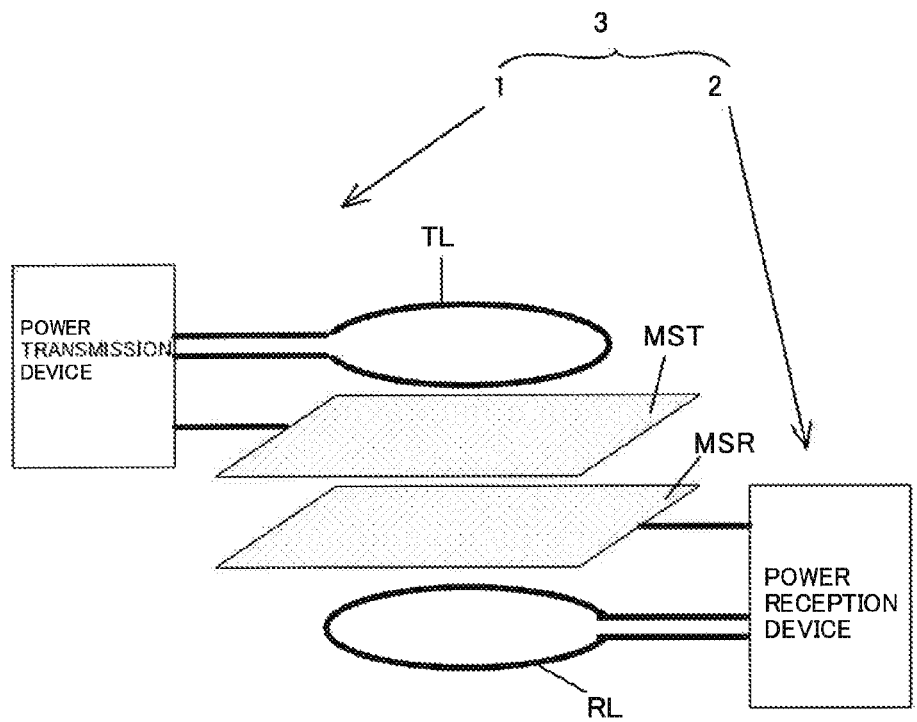
FIG. 8 is a schematic perspective view illustrating an exemplary constitution of a contactless power supply device according to a third embodiment.
Figure 9:
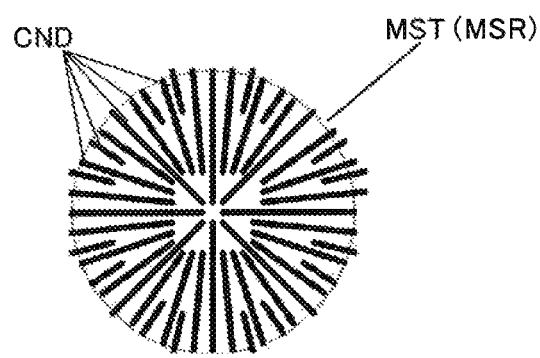
FIG. 9 is a schematic front view illustrating a mesh shaped conductor plate in the contactless power supply device according to the third embodiment.
Figure 10:
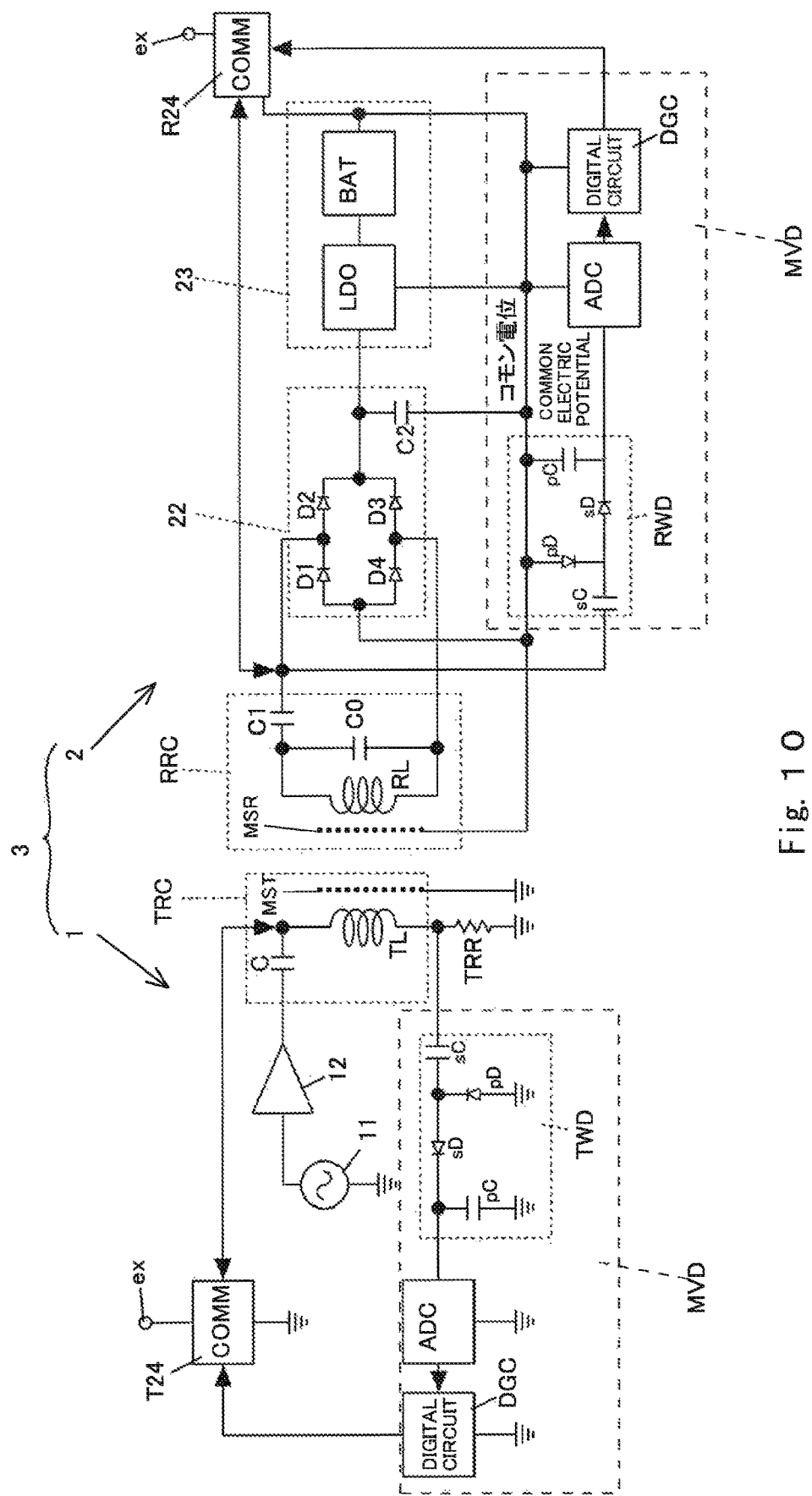
FIG. 10 is a circuit block diagram illustrating the contactless power supply device of the third embodiment.

FIG. 8 is a schematic perspective view illustrating an exemplary constitution of a contactless power supply device according to the embodiment. FIG. 9 is a schematic front view illustrating a mesh shaped conductor plate MST (or MSR) in the contactless power supply device according to the embodiment. FIG. 10 is a circuit diagram illustrating the contactless power supply device according to the embodiment.

The contactless power supply device of the embodiment is identical to the first embodiment or the second embodiment except the following. That is, two sheets of mesh shaped conductor plates MST, MSR are separately disposed with one another between the power transmission coil TL of the power transmission device 1 and the power reception coil RL of the power reception device 2, respectively, and predetermined electric potentials are applied to each conductor plate. That is, the power transmission coil TL and the power reception coil RL perform the operation similar to that of the first embodiment and the second embodiment.

As illustrated in FIG. 10, in the contactless power supply device of the embodiment, the conductor plate MST on the side close to the power transmission coil TL is coupled to a common electric potential or a ground potential of the power transmission circuit, and the conductor plate MSR on the side close to the power reception coil RL is coupled the common electric potential of the power reception circuit. Thus, the mesh shaped conductor plates MST, MSR operate as an electrostatic shield.

As illustrated in FIG. 9, in the mesh shaped conductor plates MST, MSR, a plurality of linear conductors CND are radially disposed from their own center corresponding to the center of the circular shape of the coil. Since the conductors CND are disposed in the radial direction of the circular shape, an eddy current does not flow relative to the electromotive force in the circumferential direction generated by the electromagnetic induction.

In a case of a structure where a rotation axis and a bearing (see FIG. 6, FIG. 7, and FIG. 8) are disposed at the center of the coil, a structure where these rotation center axes pass through the center of the conductor plates MST, MSR may be used.

The mesh shaped conductor plates MST, MSR may be disposed only in one of the power transmission coil TL or the power reception coil RL. Consequently, by disposing the electrostatic shield of the mesh shaped conductor plates MST, MSR coaxially disposed at the center of the power transmission coil TL and the power reception coil RL between the power transmission coil TL and the power reception coil RL and coupled to the wiring of the common electric potential of the respective resonance circuits of the power transmission coil TL and the power reception coil RL, at least one of the power transmission coil TL and the power reception coil RL can reduce the influence due to a variation of electrostatic coupling between the power transmission coil TL and the power reception coil RL and detect only the variation of the magnetic field coupling coefficient.

Disposing the electrostatic shield of the mesh shaped conductor plates between the power transmission coil TL and the power reception coil RL allows reduced influence of an external disturbance (an electric field noise) other than the power transmission device 1 and the power reception device 2.

Two effects of the mesh shaped conductor plates MST, MSR described above allows performing more accurate and high reliability detection. This is particularly suitable for industrial equipment and in-vehicle equipment.

Fourth Embodiment

In the second embodiment described above, the example where the power transmission coil TL of the power transmission device 1 and the power reception coil RL of the power reception device 2 rotate with one another is indicated. However, the power transmission device 1 and the power reception device 2 of the present invention may be secured to a system that linearly moves with one another or may be secured to a system where they are mutually secured to a fixed object and used.

Figure 11:
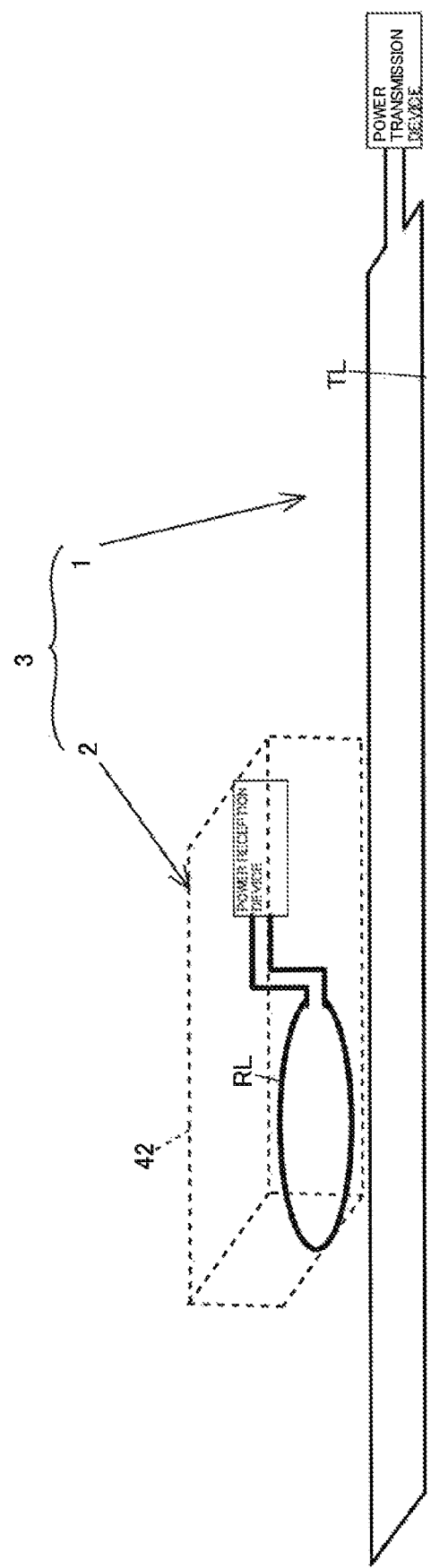
FIG. 11 is a schematic perspective view illustrating an exemplary constitution of a contactless power supply device of a fourth embodiment.

FIG. 11 is a schematic perspective view of the fourth embodiment. The embodiment is identical to the first embodiment except the following. That is, the power transmission device 1 of the first embodiment, i.e. the power transmission coil TL (a power transmission antenna) is secured inside a surface of a fixed structure (not illustrated) such as a rail having a fixed length. And the power reception device 2 of the first embodiment, i.e. the power reception coil RL (a power reception antenna) is secured on a bottom surface of a moving body 42. The moving body 42 is a movement detection object such as a cart smaller than the fixed structure and moves along the fixed structure. The power transmission coil TL of the power transmission device 1 is secured to, for example, a structure having a certain length like a railroad track, and the power reception coil RL of the power reception device 2 in the moving body 42, for example, like a vehicle moving on the railway track, has a shape sufficiently smaller than the certain length and can move along the power transmission coil TL of the power transmission device 1.

The power transmission device 1 of the power transmission coil TL and the power reception device 2 of the power reception coil RL perform the operations similar to those of the first, second, and third embodiments. The fourth embodiment is a contactless power supply device where, in the equipment constituted of the structure having the fixed length and the moving body 42 that is smaller than the structure and moves along the structure, the power transmission coil TL and the power reception coil RL are mounted to each of them and the electric power and movement information of the moving body 42 is exchanged in a non-contact manner using the high-frequency magnetic field.

The embodiment is effective in detecting, for example, an abnormal sound due to a failure and the movement of the moving body 42 as the object.

As the power transmission antenna (the power transmission coil TL), an elongated rectangular antenna is used, and, as the power reception antenna (the power reception coil RL), a circular-shaped antenna that is about the size of the short side of the power transmission antenna is used. The power transmission antenna of the power transmission device 1 may be winding like a railroad track instead of a straight line. The power reception antenna may have a quadrangular shape or a polygonal shape, instead of a circular shape. The respective coils of the power transmission coil TL and the power reception coil RL may be one turn or may be a plurality of turns.

As a modification, the power transmission device 1 and the power reception device 2 may be disposed such that the power transmission coil TL and the power reception coil RL have the opposite constitution (the power reception coil RL has a long length, and the power transmission coil TL has a small size).

When the power reception device 2 (the power reception coil RL) moves together with the moving body 42, while the relative position between the power reception coil RL and the power transmission coil TL varies, the magnetic field coupling coefficient is approximately constant because the structure keeps the distance between them approximately constant. With this structure, by the operation similar to those of the first, second, and third embodiments, the AC output data corresponding to the vibration can be obtained in the output of the wave detection circuit TWD of the power transmission device 1 or the wave detection circuit RWD of the power reception device 2. In the constitution where the moving body 42 including the power reception device 2 (the power reception coil RL) linearly moves, the vibration can be detected.

The information on the detected vibration can be transmitted in a non-contact manner using the magnetic field between the power transmission antenna of the power transmission device 1 and the power reception antenna of the power reception device 2.

Modification of Fourth Embodiment

Figure 12:
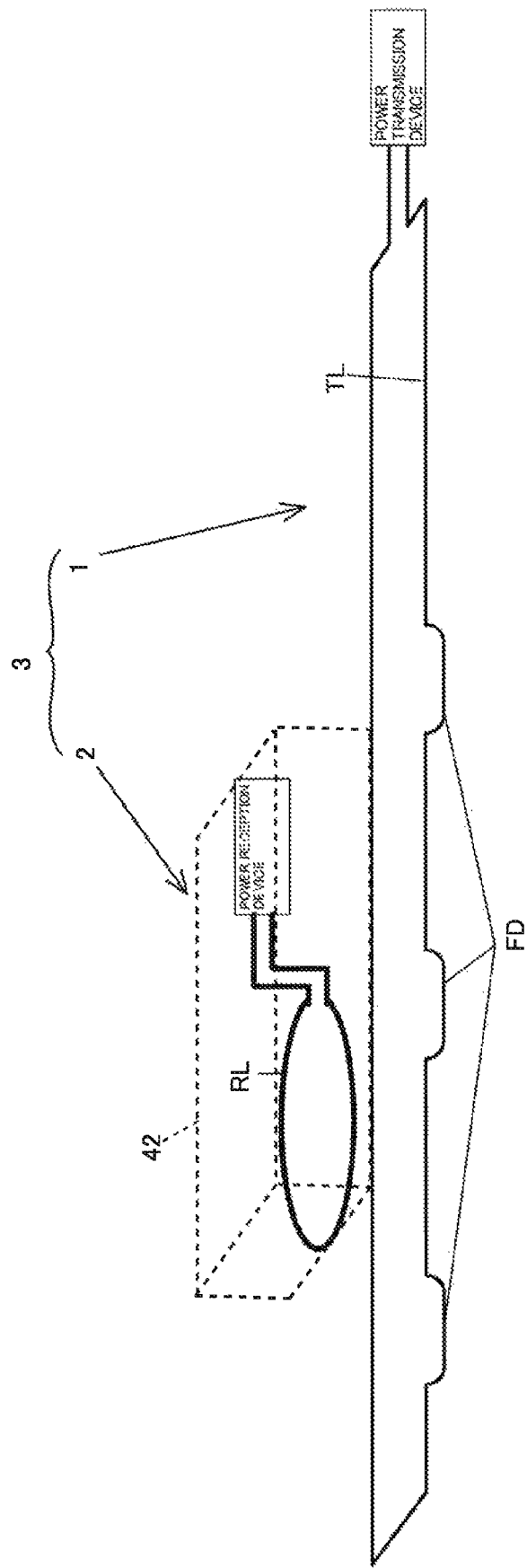
FIG. 12 is a schematic perspective view illustrating an exemplary constitution a contactless power supply device in a modification of the fourth embodiment.

FIG. 12 is a schematic perspective view of a modification of the fourth embodiment. The modification is identical to the fourth embodiment except that a plurality of deformed portions DF are disposed to the power transmission antenna TL of the fourth embodiment. By disposing, for example, a plurality of deformed portions DF (see FIG. 7) that are periodically disposed to the power transmission antenna TL, when the power reception coil RL moves and passes through the deformed portions DF, pulse waveforms can be obtained in the output of the wave detection circuits TWD, RWD. Thus, performing a data transmission of the position of the moving body 42 where the power reception device 2 is disposed to the power transmission device 1 by the communication function (NFC communication) by the high-frequency magnetic field allows, for example, display on an external display device from there or measurement of a moving speed. This allows calculation of the rotational frequency or the rotation angle, the moving speed or the movement position from the output signals of the wave detection circuits TWD, RWD.

Other Modifications of Embodiments

In any embodiment, a comparator may be used instead of the AD converter ADC. In the relative movement detection unit MVD, including a comparator that outputs an output signal as the digital signal when the extracted signal is input and exceeds a threshold allows simplifying the digital circuit DGC in a subsequent stage.

In any embodiment, the power transmission coil TL may be grounded and secured, and the power reception coil RL may be set to be floating or movable. For example, it may be reversed like a rotor of an electric generator, namely, the power reception coil RL may be grounded and secured, and the power transmission coil TL may be set to be floating or movable.

In any embodiment, as a unit to convert the vibration or the sound wave of the peripheral medium (gas, liquid, or a solid) of the power transmission coil IL and the power reception coil RL into a displacement of a coil position, a plate-shaped structure or a bar-shaped structure can be disposed.

In any embodiment, the signal processing of the digital circuit DGC may be performed by a device at a remote location by performing the data transmission of the digital signal based on the extracted signal from the AD converter ADC by the communication function (NFC communication) by the high-frequency magnetic field.

In any embodiment, the contactless power supply device, in addition to being mounted on a vehicle, can be also mounted to a moving body such as a marine vessel, heavy construction equipment, and a drone, or a movable portion of them. It is needless to say that the present invention is not limited to the embodiments described above and can be variously modified without departing from the gist of the present invention.

What is claimed is:

1. A contactless power supply device for performing power transmission and power reception of an electric power in a non-contact manner, the contactless power supply device comprising:
    a power transmission module that includes a first resonance circuit, the first resonance circuit including a power transmission coil generating a high-frequency magnetic field from a first high frequency current of the power transmission coil; and
    a power reception module that includes a second resonance circuit, the second resonance circuit including a power reception coil generating a second high frequency current from the high-frequency magnetic field generated by the power transmission coil; and
    a relative movement detection unit included in at least one of the power transmission module and the power reception module, the relative movement detection unit detecting an amplitude change of a high-frequency voltage corresponding to the first high frequency current of the power transmission coil or the second high frequency current of the power reception coil, and outputting an output signal indicating a physical relative movement of the power transmission coil and the power reception coil, and
    wherein the relative movement detection unit is configured to output a vibration amount of the power transmission coil or the power reception coil to be detected where the power transmission module or the power reception module is mounted,
    wherein the relative movement detection unit includes a wave detection circuit that extracts a DC component or an AC component from the high-frequency voltage to output the DC component or the AC component as an extracted signal, and
    wherein the contactless power supply device further comprises an AD converter that converts the extracted signal into a digital signal, and a digital circuit that performs digital filter processing or Fourier transform processing based on the digital signal of the AD converter and outputs an intensity of a frequency component as the output signal.

2. The contactless power supply device according to claim 1, wherein
    the relative movement detection unit includes a comparator that outputs the output signal as a digital signal when the extracted signal is input and exceeds a threshold.

3. The contactless power supply device according to claim 1, wherein
    the power transmission module and the power reception module include a communication unit that performs an exchange of an electric signal in a non-contact manner between the power transmission coil and the power reception coil.

4. The contactless power supply device according to claim 1, wherein
    at least one of the power transmission coil and the power reception coil includes a mesh shaped conductor plate that is separately disposed coaxially with the center of the power transmission coil and the power reception coil between the power transmission coil and the power reception coil and coupled to a wiring of a common electric potential of the respective resonance circuits of the power transmission coil and the power reception coil.

5. A power reception device for performing power reception of an electric power in a non-contact manner via a high-frequency magnetic field, the power reception device comprising:
    a resonance circuit that includes a power reception coil that generates a high frequency current from the high-frequency magnetic field; and
    a relative movement detection unit that detects an amplitude change of a high-frequency voltage corresponding to the high frequency current flowing through the resonance circuit, the relative movement detection unit outputting an output signal indicating a physical relative movement of a power transmission coil and the power reception coil,
    wherein the relative movement detection unit is configured to output a vibration amount of the power transmission coil or the power reception coil to be detected where the power transmission module or the power reception module is mounted,
    wherein the relative movement detection unit includes a wave detection circuit that extracts a DC component or an AC component from the high-frequency voltage to output the DC component or the AC component as an extracted signal, and
    wherein the power reception device further comprises an AD converter that converts the extracted signal into a digital signal, and a digital circuit that performs digital filter processing or Fourier transform processing based on the digital signal of the AD converter and outputs an intensity of a frequency component as the output signal.

6. The power reception device according to claim 5, wherein
    the relative movement detection unit includes a comparator that outputs the output signal as a digital signal when the extracted signal is input and exceeds a threshold.

7. The power reception device according to claim 5, further comprising
    a communication unit that performs an exchange of an electric signal in a non-contact manner between the power transmission coil and the power reception coil.

8. The power reception device according to claim 5, wherein
    at least one of the power transmission coil and the power reception coil includes a mesh shaped conductor plate that is separately disposed coaxially with the center of a magnetic flux between the power transmission coil and the power reception coil and coupled to a wiring of a common electric potential of the respective resonance circuits of the power transmission coil and the power reception coil.

9. A power transmission device for performing power transmission of an electric power in a non-contact manner to a power reception coil via a high-frequency magnetic field, the power transmission device comprising:
 a resonance circuit that includes a power transmission coil that generates the high-frequency magnetic field; and
 a relative movement detection unit that detects an amplitude change of a high-frequency voltage corresponding to a high frequency current induced in the resonance circuit corresponding to a counter-electromotive force by a variation of an induced current in the power reception coil, the relative movement detection unit outputting an output signal indicating a physical relative movement of the power transmission coil and the power reception coil,
 wherein the relative movement detection unit is configured to output a vibration amount of the power transmission coil or the power reception coil to be detected where the power transmission module or the power reception module is mounted,
 wherein the relative movement detection unit includes a wave detection circuit that extracts a DC component or an AC component from the high-frequency voltage to output the DC component or the AC component as an extracted signal, and
 wherein the power transmission device further comprises an AD converter that converts the extracted signal into a digital signal, and a digital circuit that performs digital filter processing or Fourier transform processing based on the digital signal of the AD converter and outputs an intensity of a frequency component as the output signal.

10. The power transmission device according to claim 9, wherein
 the relative movement detection unit includes a comparator that outputs the output signal as a digital signal when the extracted signal is input and exceeds a threshold.

11. The power transmission device according to claim 9, further comprising
 a communication unit that performs an exchange of an electric signal in a non-contact manner between the power transmission coil and the power reception coil.

12. The power transmission device according to claim 9, wherein
 at least one of the power transmission coil and the power reception coil includes a mesh shaped conductor plate that is separately disposed coaxially with the center of a magnetic flux between the power transmission coil and the power reception coil and coupled to a wiring of a common electric potential of the respective resonance circuits of the power transmission coil and the power reception coil.

13. A contactless power supply device for performing power transmission and power reception of an electric power in a non-contact manner, the contactless power supply device comprising:
 a power transmission module that includes a first resonance circuit, the first resonance circuit including a power transmission coil generating a high-frequency magnetic field from a first high frequency current of the power transmission coil; and
 a power reception module that includes a second resonance circuit, the second resonance circuit including a power reception coil generating a second high frequency current from the high-frequency magnetic field generated by the power transmission coil, wherein
 in the power transmission module and the power reception module, the power transmission coil and the power reception coil are mounted to a fixed bearing and a rotator rotating by being rotatably mounted to the bearing, respectively to face each other coaxially, and
 at least one of the power transmission module and the power reception module includes a relative movement detection unit that detects an amplitude change of a high-frequency voltage corresponding to the first high frequency current flowing through the first resonance circuit of the power transmission module or the second high frequency current flowing through the second resonance circuit of the power reception module, and outputs an output signal indicating a physical relative movement of the power transmission coil and the power reception coil,
 wherein the relative movement detection unit is configured to output a vibration amount of the power transmission coil or the power reception coil to be detected where the power transmission module or the power reception module is mounted,
 wherein the relative movement detection unit includes a wave detection circuit that extracts a DC component or an AC component from the high-frequency voltage to output the DC component or the AC component as an extracted signal, and
 wherein the contactless power supply device further comprises an AD converter that converts the extracted signal into a digital signal, and a digital circuit that performs digital filter processing or Fourier transform processing based on the digital signal of the AD converter and outputs an intensity of a frequency component as the output signal.

14. The contactless power supply device according to claim 13, wherein
 the relative movement detection unit includes a comparator that outputs the output signal as a digital signal when the extracted signal is input and exceeds a threshold.

15. The contactless power supply device according to claim 14, further comprising
 a halting unit that is coupled to the comparator, the halting unit determining as abnormal corresponding to the digital signal exceeding the threshold and halting rotation of the rotator.

16. The contactless power supply device according to claim 13, wherein
 the power transmission module and the power reception module include a communication unit that performs an exchange of an electric signal in a non-contact manner between the power transmission coil and the power reception coil.

17. The contactless power supply device according to claim 13, wherein
 at least one of the power transmission coil and the power reception coil includes a mesh shaped conductor plate that is separately disposed coaxially with the center of a magnetic flux between the power transmission coil and the power reception coil and coupled to a wiring of a common electric potential of the respective resonance circuits of the power transmission coil and the power reception coil.

18. The contactless power supply device according to claim 13, further comprising a calculation unit coupled to the relative movement detection unit, the calculation unit calculating a rotational frequency or a rotation angle of the rotator from an output signal of the relative movement detection unit.

19. A contactless power supply device for performing power transmission and power reception of an electric power in a non-contact manner, the contactless power supply device comprising:
a power transmission module that includes a first resonance circuit, the first resonance circuit including a power transmission coil generating a high-frequency magnetic field from a first high frequency current of the power transmission coil; and
a power reception module that includes a second resonance circuit, the second resonance circuit including a power reception coil generating a second high frequency current from the high-frequency magnetic field generated by the power transmission coil, wherein
in the power transmission module and the power reception module, the power transmission coil and the power reception coil are mounted to a fixed structure and a moving body movable away from the structure, respectively to face each other coaxially, and
at least one of the power transmission module and the power reception module includes a relative movement detection unit that detects an amplitude change of a high-frequency voltage corresponding to the first high frequency current flowing through the first resonance circuit of the power transmission module or the second high frequency current flowing through the second resonance circuit of the power reception module, and outputs an output signal indicating a physical relative movement of the power transmission coil and the power reception coil,
wherein the relative movement detection unit is configured to output a vibration amount of the power transmission coil or the power reception coil to be detected where the power transmission module or the power reception module is mounted,
wherein the relative movement detection unit includes a wave detection circuit that extracts a DC component or an AC component from the high-frequency voltage to output the DC component or the AC component as an extracted signal, and wherein the contactless power supply device further comprises an AD converter that converts the extracted signal into a digital signal, and a digital circuit that performs digital filter processing or Fourier transform processing based on the digital signal of the AD converter and outputs an intensity of a frequency component as the output signal.

20. The contactless power supply device according to claim 19, wherein
the relative movement detection unit includes a comparator that outputs the output signal as a digital signal when the extracted signal is input and exceeds a threshold.

21. The contactless power supply device according to claim 20, further comprising
a halting unit that is coupled to the comparator, the halting unit determining as abnormal corresponding to the digital signal exceeding the threshold and halting the movement of the moving body.

22. The contactless power supply device according to claim 19, wherein
the power transmission module and the power reception module include a communication unit that performs an exchange of an electric signal in a non-contact manner between the power transmission coil and the power reception coil.

23. The contactless power supply device according to claim 19, wherein
at least one of the power transmission coil and the power reception coil includes a mesh shaped conductor plate that is separately disposed coaxially with the center of a magnetic flux between the power transmission coil and the power reception coil and coupled to a wiring of a common electric potential of the respective resonance circuits of the power transmission coil and the power reception coil.

24. The contactless power supply device according to claim 19, further comprising
a calculation unit coupled to the relative movement detection unit, the calculation unit calculating a moving speed or a movement position of the moving body from an output signal of the relative movement detection unit.

* * * * *